US009349236B2

(12) United States Patent
Mutti et al.

(10) Patent No.: US 9,349,236 B2
(45) Date of Patent: May 24, 2016

(54) SOLUTIONS FOR RELAY ATTACKS ON PASSIVE KEYLESS ENTRY AND GO

(71) Applicant: ASSA ABLOY Czech & Slovakia s.r.o. Odstepny zavod FAB Vehicle Security, Tyniste nad Orlici (CZ)

(72) Inventors: Carlo Secondo Mutti, Origlio (CH); Davide Spedaliere, Ghiffa (IT)

(73) Assignee: Assa Abloy Czech & Slovakia s.r.o., Tyniste nad Orlici (CZ)

( * ) Notice: Subject to any disclaimer, the term of this patent is extended or adjusted under 35 U.S.C. 154(b) by 81 days.

(21) Appl. No.: 14/349,494

(22) PCT Filed: Oct. 3, 2012

(86) PCT No.: PCT/EP2012/069520
§ 371 (c)(1),
(2) Date: Apr. 3, 2014

(87) PCT Pub. No.: WO2013/050409
PCT Pub. Date: Apr. 11, 2013

(65) Prior Publication Data
US 2014/0240090 A1  Aug. 28, 2014

(30) Foreign Application Priority Data

Oct. 7, 2011 (CH) ........................ 1641/11

(51) Int. Cl.
*G05B 19/00* (2006.01)
*G07C 9/00* (2006.01)
(Continued)

(52) U.S. Cl.
CPC ............ *G07C 9/00309* (2013.01); *B60R 25/24* (2013.01); *G07C 5/008* (2013.01)

(58) Field of Classification Search
None
See application file for complete search history.

(56) References Cited

U.S. PATENT DOCUMENTS

2005/0024181 A1  2/2005  Hofbeck et al.
2005/0164728 A1  7/2005  Matsubara et al.
(Continued)

FOREIGN PATENT DOCUMENTS

CN  1629895 A  6/2005
CN  1717705 A  1/2006
(Continued)

OTHER PUBLICATIONS

Francillon, et al., Relay Attacks on Passive Keyless Entry and Start Systems in Modern Cars, Eidgenössische Technische Hochschule Zürich, Department of Computer Science (2011).

*Primary Examiner* — Ojiako Nwugo
(74) *Attorney, Agent, or Firm* — The Webb Law Firm (57) ABSTRACT

A passive entry system, in particular for a motor vehicle, comprising: a mobile device to be carried by a user, said mobile device comprising a low-frequency transceiver for short range communication, an ultra-high-frequency transceiver for long range communication and information concerning access, such as an access code, which is transmittable by said transceivers; and a locking device which is to be unlocked by the mobile device, said locking device comprising a low-frequency transceiver for short-range communication and an ultra-high frequency transceiver for long range communication to receive said information concerning access, such the access code. The transceivers of the mobile device communicates with the transceiver of the locking device and exchange information concerning access, such as said access code, to the locking system via the respective transceivers, wherein the communication range of the ultra-high-frequency transceiver of the mobile device is limited to a short range in a normal operating mode of the mobile device.

9 Claims, 6 Drawing Sheets

(51) Int. Cl.
*B60R 25/24* (2013.01)
*G07C 5/00* (2006.01)

(56) References Cited

U.S. PATENT DOCUMENTS

| | | |
|---|---|---|
| 2006/0044108 A1 | 3/2006 | Nowottnick |
| 2006/0083406 A1 | 4/2006 | Ishimura et al. |
| 2006/0255909 A1 | 11/2006 | Pavatich et al. |
| 2006/0255911 A1 | 11/2006 | Taki et al. |
| 2007/0030118 A1 | 2/2007 | Nowottnick |
| 2007/0149141 A1* | 6/2007 | Joos ............... B60R 25/245 455/73 |
| 2008/0157919 A1 | 7/2008 | Sugiura et al. |
| 2010/0245038 A1* | 9/2010 | Ghabra ............ G07C 9/00309 340/5.61 |
| 2010/0305779 A1* | 12/2010 | Hassan ............... G01C 17/38 701/2 |
| 2012/0062358 A1* | 3/2012 | Nowottnick ..... G06K 19/07767 340/5.2 |
| 2012/0282913 A1 | 11/2012 | Kaindl et al. |

FOREIGN PATENT DOCUMENTS

| | | |
|---|---|---|
| CN | 1791882 A | 6/2006 |
| CN | 1801660 A | 7/2006 |
| CN | 101211475 A | 7/2008 |
| DE | 101 49 344 A1 | 4/2003 |
| DE | 103 01 146 A1 | 7/2004 |
| DE | 103 34 625 A1 | 3/2005 |
| DE | 10 2004 052904 A1 | 6/2006 |
| DE | 10 2010 006149 A1 | 8/2011 |
| JP | 5301561 A | 11/1993 |
| JP | 2007217971 A | 8/2007 |

\* cited by examiner

SOLUTIONS FOR RELAY ATTACKS ON PASSIVE KEYLESS ENTRY AND GO

CROSS-REFERENCE TO RELATED APPLICATIONS

This application is the United States national phase of International Application No. PCT/EP2012/069520 filed Oct. 3, 2012, and claims priority to Switzerland Patent Application No. 1641/11 filed Oct. 7, 2011, the disclosures of which are hereby incorporated in their entirety by reference.

TECHNICAL FIELD OF THE INVENTION

The present invention relates to a system for preventing relay attacks against radio frequency based locking systems according to preamble of claim 1.

PRIOR ART

Nowadays the major issue regarding the Passive Keyless Entry and/or Passive Keyless Go (PKE/GO) system in modern vehicles is the "Relay Attack". Using the system characteristics, with very inexpensive tools, it is possible to open and to start all the new vehicles with PKE/GO system.

Only by amplifying and extend the range of the LF signal, generated by the vehicle and used to communicate with the key, it is possible to open and to start the vehicle even if the owner is far away the vehicle, all without any suspect from the key owner.

This problem has been described in detail in a publication by the authors Aurelien Francillon, Boris Danev, Srdjan Capkun of ETH Zürich having the title "Relay Attacks on Passive Keyless Entry and Start Systems in Modern Vehicles".

Figure 1:
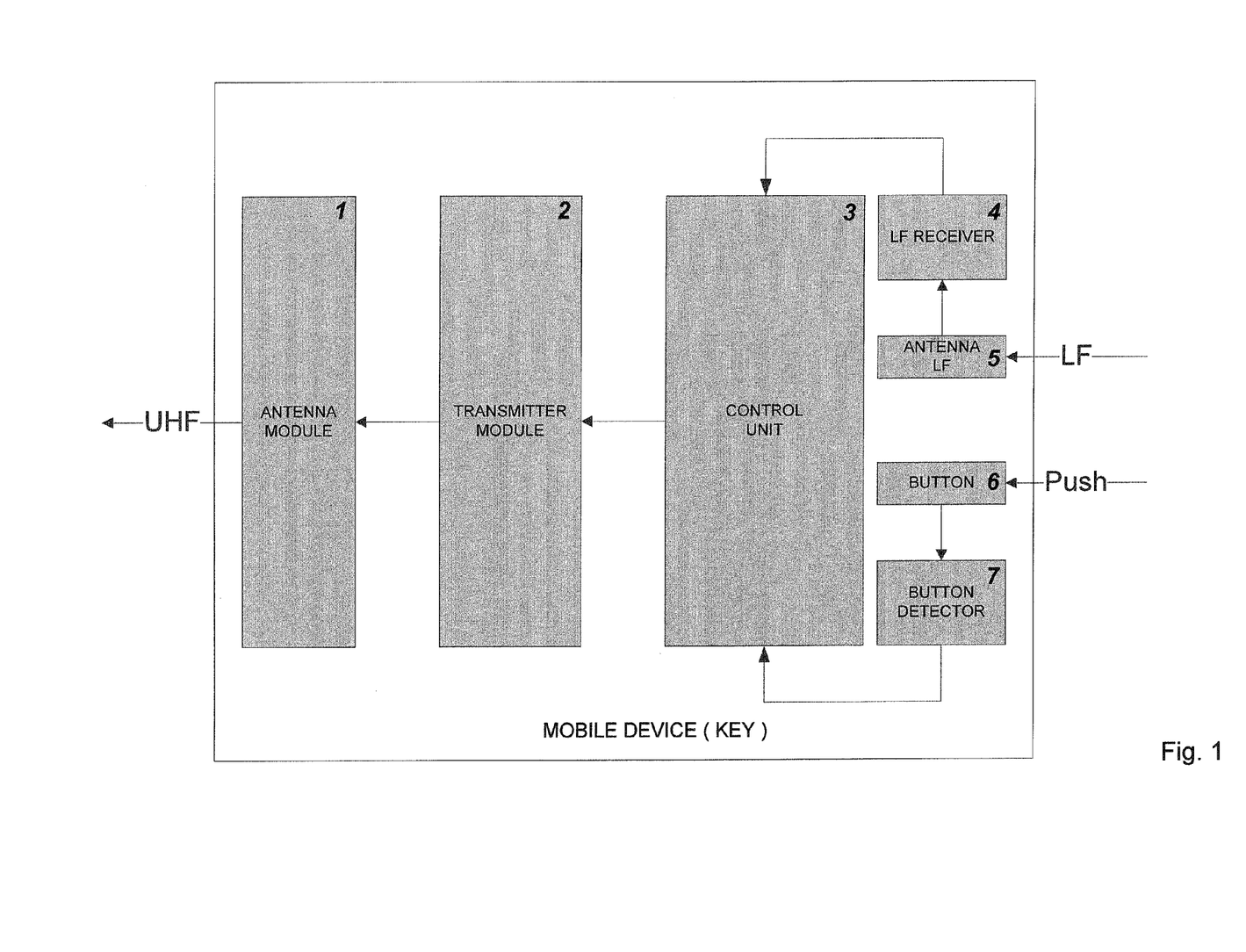
FIG. 1 shows a schematic view of a mobile device, such as a key to access a car.

In FIG. 1 there is shown a mobile device, such as a key which can be used in PKE-Systems. In summary the PKE-System usually comprises the following steps in order to open and to start a car:
  triggering the system (e.g. touching the door handles), the vehicle turn on the LF antenna and sends the commands to the Mobile Device (key); and
  the key is awake through LF signal (4,5) and answers (1,2,3) via UHF directly to the vehicle with the right command to unlock the door.

The same applies when the start/stop button inside the vehicle for the Passive Keyless Go is pushed.

Figure 2:
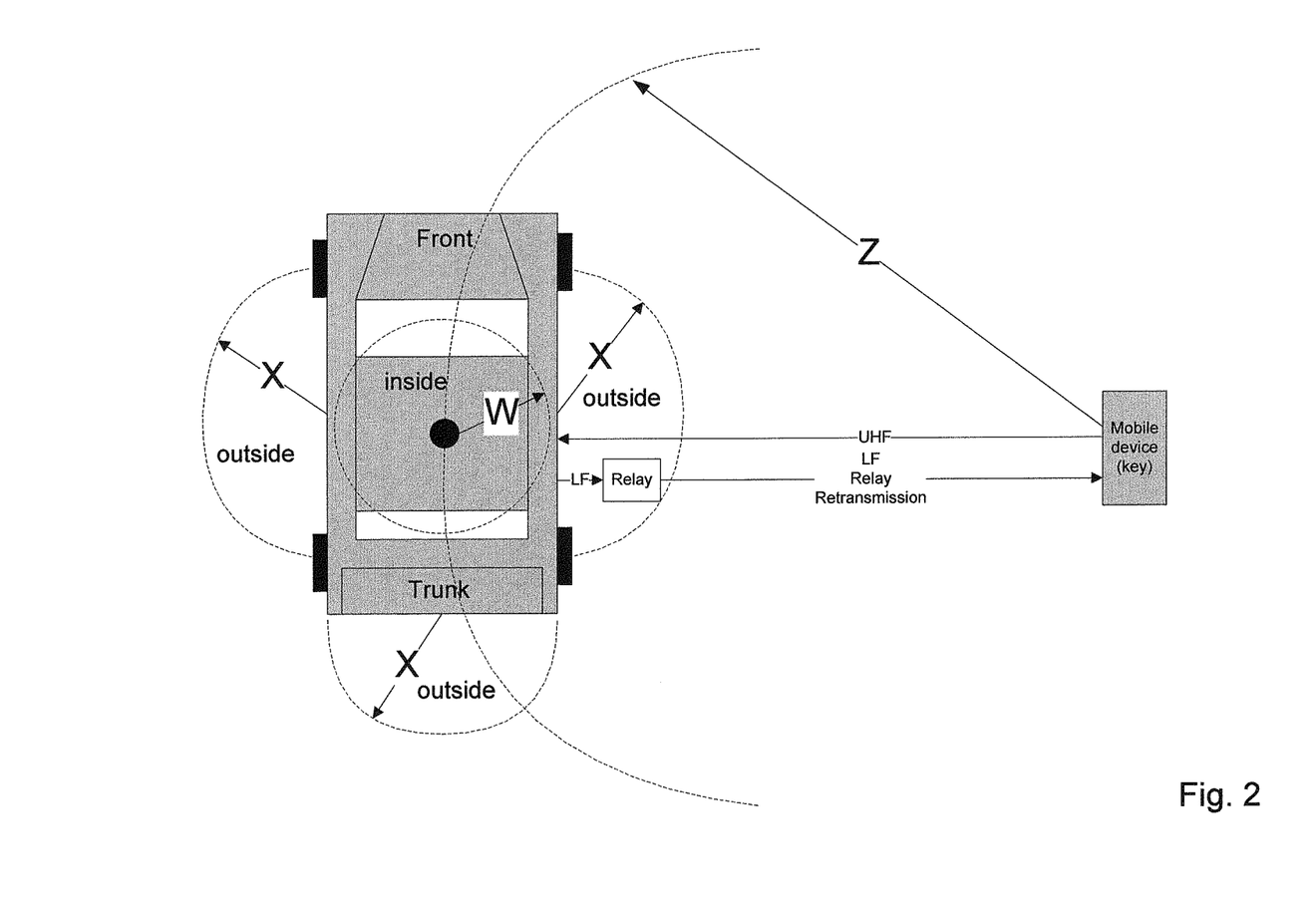
FIG. 2 shows a schematic view of an overall system of a relay attack as described prior art chapter.
Figure 3:
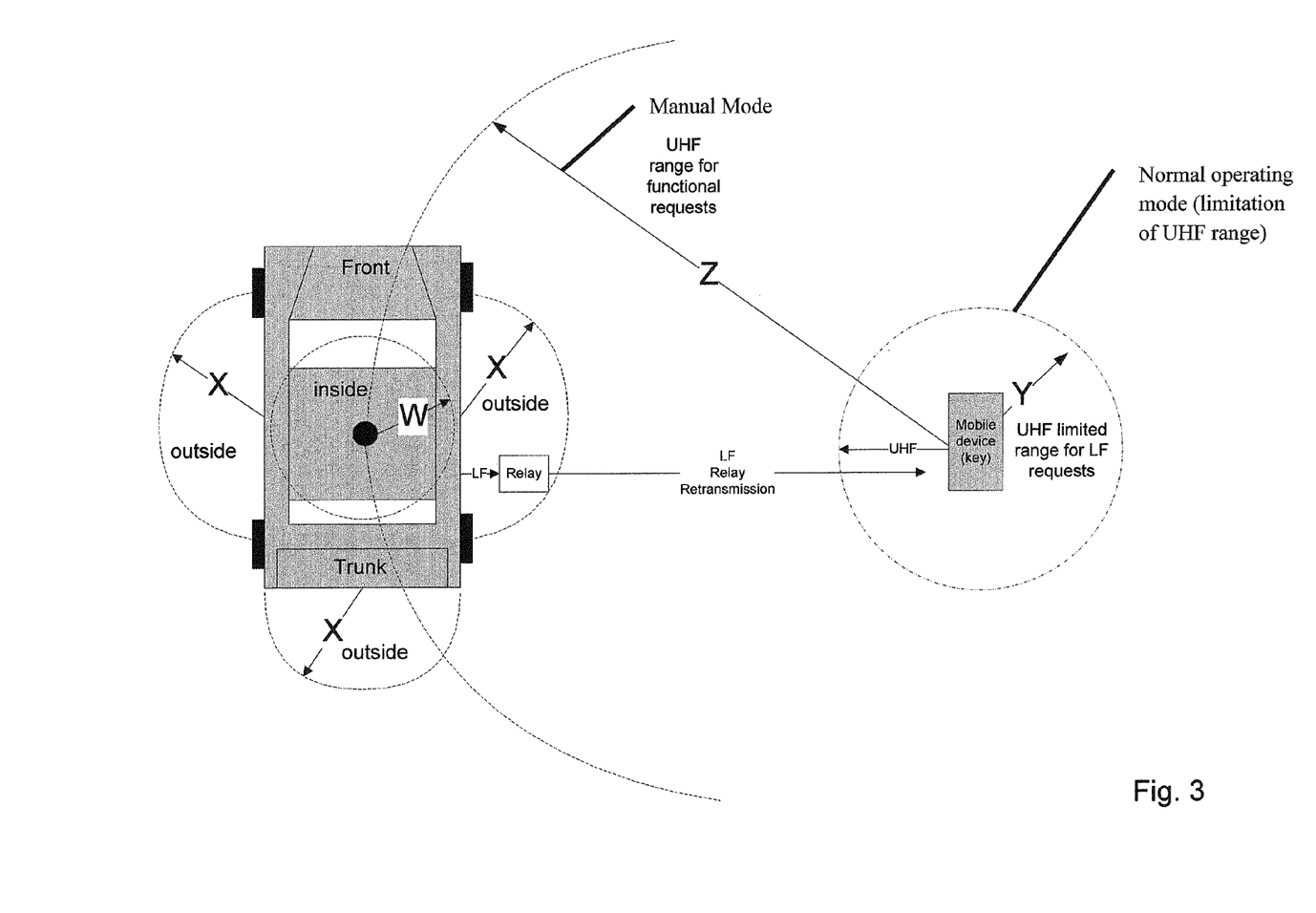
FIG. 3 shows a schematic view of an overall system according to the present invention.

The LF is a short range communication, usually not more than 1-2 m, meanwhile the UHF range is up to 100 m. This is illustrated in FIG. 2.

The relay attack consists to extend the LF range X, so you can open and start the vehicle even if the key owner is far away but still in the range Z of the UHF as it is also described in the above mentioned publication.

To make an illustrative example: the owner sits in a restaurant and the vehicle just parked outside the restaurant. The thief with the relay, within the range X, touches the door handle, the vehicle starts the communication procedure, the relay extends the LF range, the remote key is awake from the LF signal and answers via UHF signal. The vehicle unlocks the door, the thief enters, push the start button, the LF starts again the communication, extended by the relay, the key answers, and the vehicle engine starts . . . and the vehicle is gone!

SUMMARY OF THE INVENTION

Starting from this prior art it is an object of the present invention to provide a locking system having a higher security against such relay attacks.

This object is solved by claim 1. Therefore a passive entry system, in particular for a motor vehicle comprising:
  a mobile device to be carried by a user, said mobile device comprising a low-frequency transceiver for short range communication, an ultra-high-frequency transceiver for long range communication and information concerning access, such as an access code, which is transmittable by said transceivers; and
  a locking device which is to be unlocked by the mobile device, said locking device comprising a low-frequency transceiver for short-range communication and an ultra-high frequency transceiver for long range communication to receive said information concerning access, such as the access code.

The transceivers of the mobile device communicates with the transceivers of the locking device and exchange information concerning access, such as said access code, to the locking system via the respective transceivers. The communication range of the ultra-high-frequency transceiver of the mobile device is limited to a short range in a normal operating mode of the mobile device.

The limitation of the range has the advantage that communication of the ultra-high-frequency transceiver becomes limited to a restricted range. Therefore the signal from said transceiver will only be sent within this short range, which means that the mobile device has to be physically close to the locking device in order to send the information with which the locking device will be unlocked to the locking device. In case the mobile device is far away from the car and receives a fraud signal that originates from the car and has been amplified by a fraud relay, the mobile device may send an answer, for example a code to unlock the locking device, to this signal, but the answer will not reach the locking device.

The term limitation is preferably to be understood as physical limitation which means that the mobile device is only able to send the access information only within a short physical range such as less than 10 meters or less than 2 meters for example.

Preferably the mobile device comprises means such as a button, to activate the transmission of the information concerning access, wherein upon a manual actuation of said means of the mobile device the condition of the mobile device is changeable from said normal operating mode to a manual mode, wherein in said manual mode the long range communication of the ultra-high-frequency transceiver of the mobile device is active such that access information is transmittable over the long range.

Hence the mobile device can have two operating modes. In the normal operating mode the mobile device and the locking device are protected against relay attacks since the long range communication is deactivated. In the manual mode long range communication is activated and long range exchange of access information will take place upon manual and deliberate actuation of the mobile device by the user.

Typical values of low-frequency are usually 125 kHz and of high-frequency are usually 315 MHz or 433 MHz or 868 MHZ or 915 MHz.

Further embodiments of the invention are laid down in the dependent claims.

BRIEF DESCRIPTION OF THE DRAWINGS

Preferred embodiments of the invention are described in the following with reference to the drawings 3 to 6, which are for the purpose of illustrating the present preferred embodiments of the invention and not for the purpose of limiting the same. In the drawings.

DESCRIPTION OF PREFERRED EMBODIMENTS

Preferred embodiments of the invention are described in the following with reference to the drawings or figures, respectively, which are for the purpose of illustrating the present preferred embodiments of the invention and not for the purpose of limiting the same.

The way to solve this kind of relay attacks on PKE/GO system, is putting some countermeasure on the communication between the key and the vehicle and not vice versa as attempted until now.

The new approach is to limit the communication range Z as indicated in FIG. 2 from the key to vehicle via UHF in the PKE/GO system. Therefore the communication range of the ultra-high-frequency transceiver of the mobile device is limited to a short range in a normal operating mode of the mobile device.

This limitation of the communication range could be obtained applying one of the following strategies:
a) reducing key transmission power;
b) increasing the transmission power;
c) adapting key antenna matching network;
d) using different antenna type;
e) using different antenna design;
f) using different antenna gain;
g) any combinations of the above strategies;
h) or any other solution to reduce and limit the communication range.

In this manner, at any requests from the vehicle via LF signal, via relay or not, the key answers only adopting one or more of the above strategies, limiting the UHF range to less than Y=X+W meters.

The mobile unit, preferably a key, can also be operated in a manual mode which is applicable when the user intends to unlock the locking system (e.g. the car) manually. For that reason the mobile unit comprises at least one button which can be activated by the user. When the user presses said button, the above strategies are not applied. Hence the normal operating mode of the mobile device will be changed into a manual mode, resulting in the normal use of the key, with UHF range Z. With other words: Upon a manual actuation the mobile device the condition of the mobile device is changeable from said normal operating mode to a manual mode, wherein in said manual mode the long range communication of the ultra-high-frequency transceiver of the mobile device is activatable. Hence the user can manually unlock the car since the transceiver of mobile unit communicates without a limitation of the range of the ultra-high-frequency channel. This is illustrated in the below.

The invention is valid for Passive Keyless Entry and/or Passive Keyless Go.

According to preferred embodiments the invention can be implemented in the embodiments as described in the following. Preferably the invention can be implemented in a purely hardware embodiment or in a purely software/firmware embodiment or an embodiment in which hardware as well as software/firmware are adapted to the invention. These embodiments will be described in the following with reference to the drawings:

First Embodiment

In the first embodiment the limitation the range of the ultra-high-frequency transceiver of the mobile device is limited to a short range in a normal operating mode of the mobile device is provided by means of hardware components.

Figure 4:
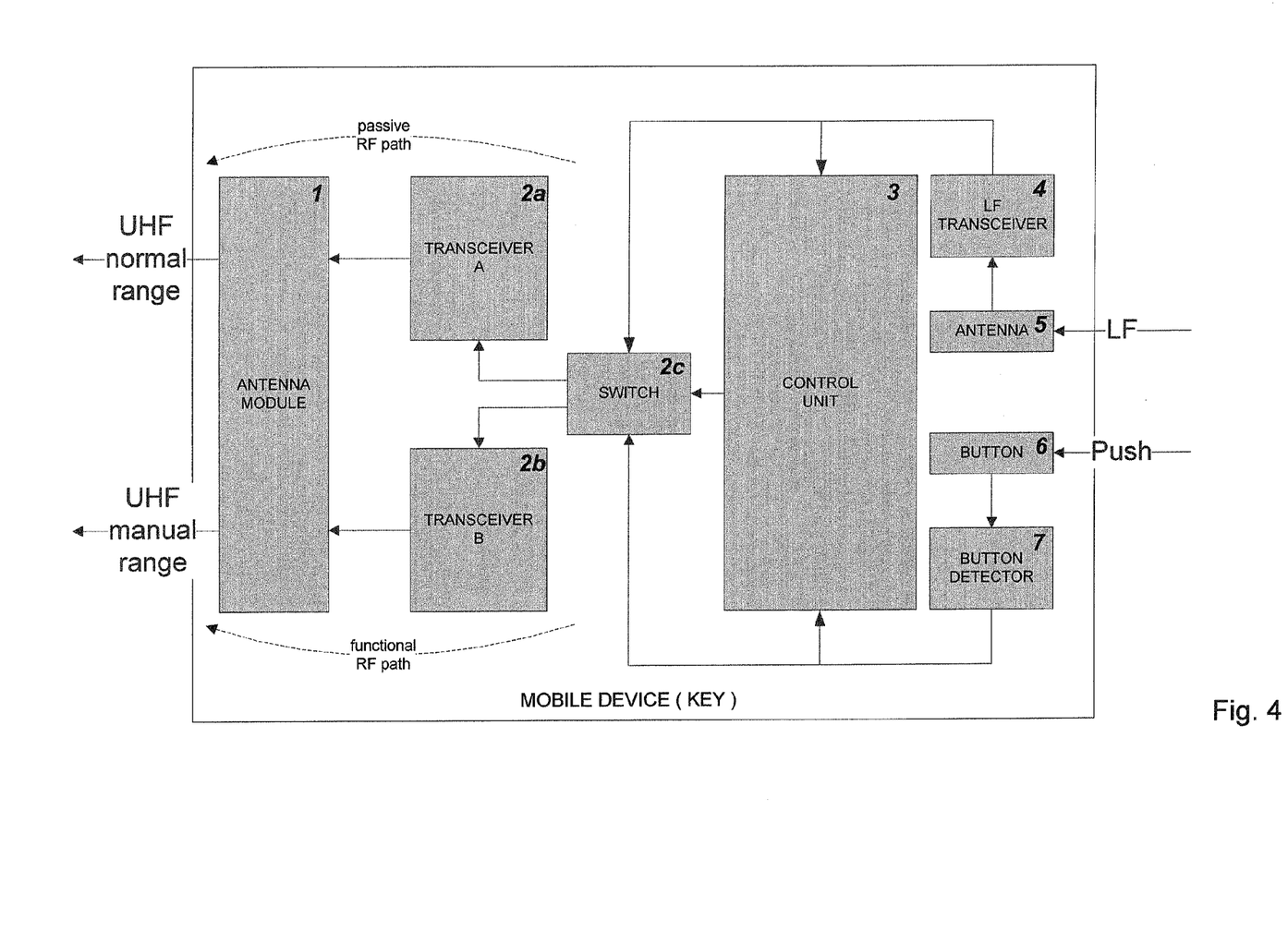
FIG. 4 shows a first embodiment of a mobile device according to the present invention.

FIG. 4 illustrates a possible embodiment, in particular said first embodiment, of a mobile device in which the range of the ultra-high-frequency transceiver is limited accordingly.

The solutions, using only hardware implementation to limit the communication range Z from the key to vehicle via UHF, are preferably obtained by:
a) reducing key transmission power;
  automatic switch (2c) on passive RF path with HW attenuator inside (2a) using the same antenna inside (1);
  automatic switch (2c) on passive RF path with HW attenuator inside (2a) using different antenna inside (1);
b) increasing the transmission power;
  automatic switch (2c) on functional RF path with HW amplifier inside (2b) using the same antenna inside (1);
  automatic switch (2c) on functional RF path with HW amplifier inside (2b) using different antenna inside (1);
c) adapting key antenna matching network;
  automatic switch (2c) on passive RF path with component (resistors, capacitors, inductors) inside (2a) with different values using the same antenna inside (1);
  automatic switch (2c) on passive RF path with component (resistors, capacitors, inductors) inside (2a) with different values using different antenna inside (1);
d) using different antenna type;
  automatic switch (2c) either passive or functional RF path using one or more different antenna types inside (1);
e) using different antenna design;
  automatic switch (2c) either passive or functional RF path using one or more different antenna design inside (1);
f) using different antenna gain;
  automatic switch (2c) either passive or functional RF path using one or more different antenna gain inside (1).
g) using any combinations of the above strategies.

Second Embodiment

In the second embodiment the limitation the range of the ultra-high-frequency transceiver of the mobile device is limited to a short range in a normal operating mode of the mobile device is provided by means of software components, hence by means of a programmed software solution.

Figure 5:
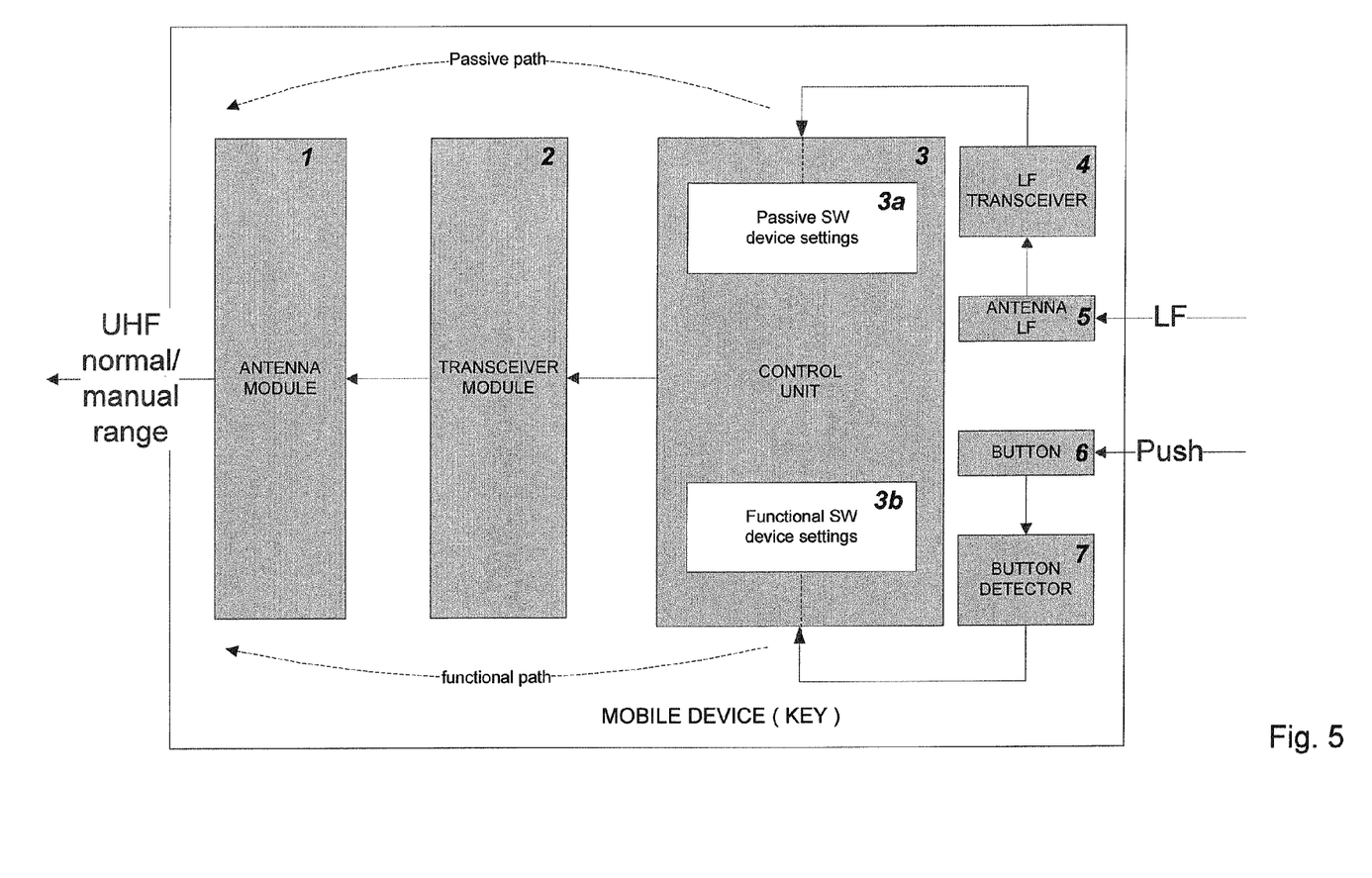
FIG. 5 shows a second embodiment of a mobile device according to the present invention.

FIG. 5 illustrates a possible embodiment, in particular said second embodiment, of a mobile device in which the range of the ultra-high-frequency transceiver is limited accordingly.

Using the right software device settings (3a, 3b) in the control unit (3) is possible to adjust the UHF power transmission:

By LF request (4,5), the control unit (3) uses passive software/firmware settings (3a), in order to have limited UHF range Y;

By pushing one of the key buttons (6,7), the control unit (3) uses functional software/firmware settings (3b), in order to have functional UHF range Z;

This implementation could be applied on the existing mobile device (key), without any hardware modifications.

Third Embodiment

In the third embodiment the limitation the range of the ultra-high-frequency transceiver of the mobile device is limited to a short range in a normal operating mode of the mobile device is provided by means of software components and hardware components.

Figure 6:
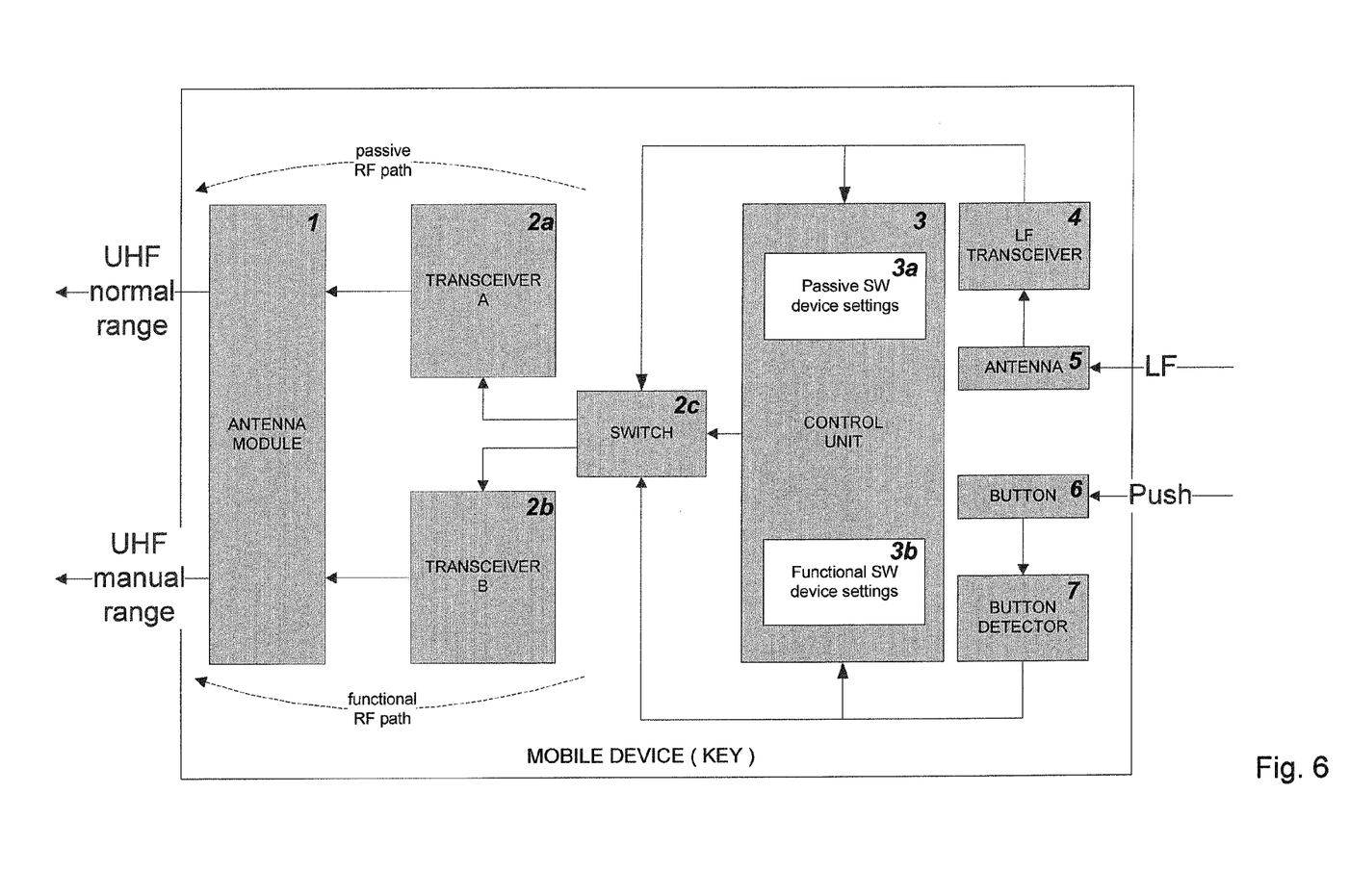
FIG. 6 shows a third embodiment of a mobile device according to the present invention.

FIG. 6 illustrates a possible embodiment, in particular said third embodiment, of a mobile device in which the range of the ultra-high-frequency transceiver is limited accordingly.

The "mixed" implementation is the most complete solution from optimization point of view, providing more flexibility in term of range Y selection.

This is achieved by combining strategies described in embodiments 1 and 2.

The invention claimed is:

1. A passive entry system, for a motor vehicle, comprising:
a mobile device to be carried by a user, said mobile device comprising a low-frequency transceiver for short range communication, an ultra-high-frequency transceiver for long range communication and information concerning access which is transmittable by said transceivers; and
a locking device which is to be unlocked by the mobile device, said locking device comprising a low-frequency transceiver for short-range communication and an ultra-high frequency transceiver for long range communication, the low-frequency transceiver and the ultra-high frequency transceiver each to receive said information concerning access,
wherein the transceivers of the mobile device communicate with the transceivers of the locking device and exchange said information concerning access to the locking device via the respective transceivers, wherein
a communication range of the ultra-high-frequency transceiver of the mobile device is limited to a short range in a normal operating mode of the mobile device and
wherein the mobile device comprises elements to activate the transmission of the information concerning access, wherein upon a manual actuation of said elements of the mobile device the condition of the mobile device is changeable from said normal operating mode to a manual mode, wherein in said manual mode the long range communication of the ultra-high-frequency transceiver of the mobile device is active such that access information is transmittable over the long range.

2. The passive entry system according to claim 1, wherein said at least one element is a button.

3. The passive entry system according to claim 1, wherein short range communication is utilized when communication initiated by one of the transceivers of the locking device and, wherein said communication is a request of the locking device to the mobile device to send the information concerning access.

4. The passive entry system according to claim 1, wherein limitation of the communication range of the mobile device is provided by using a different antenna design of the mobile device and by using a different gain.

5. The passive entry system according to claim 1, wherein limitation of the communication range of the mobile device is provided by at least one of:
reducing transmission power of at least one of the transceivers of the mobile device by changing value and/or number of electronic and/or software parameters in its normal operating mode;
increasing transmission power of at least one of the transceivers of the mobile device by changing value and/or number of electronic and/or software parameters in its manual mode;
adapting an antenna matching network of the mobile device by changing value and/or number of electronic components;
using different antenna types of the mobile device; and
using different antenna design of the mobile device and/or by using different gain.

6. The passive entry system according to claim 1, wherein limitation of the communication range of the mobile device is provided by means of a programmed software solution.

7. The passive entry system according to claim 1, wherein long range communication is between 10 meters and 200 meters and wherein short range communication is between 0 meters and 10 meters.

8. The passive entry system according to claim 1, wherein long range communication is between 10 meters and 200 meters and wherein short range communication is between 0 meters and 2 meters.

9. The passive entry system of claim 1, wherein the information concerning access in an access code.

* * * * *